United States Patent Office 3,551,398
Patented Dec. 29, 1970

3,551,398
FLUORINE CONTAINING COPOLYMERS
Yutaka Kometani, Takarazuka-shi, Hyogo-ken, and Masayoshi Tatemoto, Takatsuki-shi, Osaka-fu, Japan, assignors to Daikin Kogy Kabushiki Kaisha, Kita-ku, Osaka-shi, Japan
No Drawing. Filed Oct. 12, 1966, Ser. No. 586,051
Claims priority, application Japan, Oct. 22, 1965, 40/64,992
Int. Cl. C08f *15/06*
U.S. Cl. 260—87.5      2 Claims

ABSTRACT OF THE DISCLOSURE

A cross-linkable copolymer comprising between 30 and 98.5 mole percent of an unsaturated hydrofluoro compound having the formula:

$$R_f\text{---}CH=CF_2$$

wherein $R_f$ is one member of the group consisting of fluorine, perfluoroalkyl of 1 to 3 carbon atoms, ω-chloroperfluoroalkyl of 1 to 3 carbon atoms and ω-hydroperfluoroalkyl of 1 to 3 carbon atoms; and between 1.5 to 70 mole percent of an unsaturated fluoro compound having the formula:

$$R'_f\text{---}CF=CF_2$$

wherein $R'_f$ is one member of the group consisting of perfluoroalkyl of 1 to 3 carbon atoms, ω-chloroperfluoroalkyl of 1 to 3 carbon atoms and ω-hydroperfluoroalkyl of 1 to 3 carbon atoms.

---

This invention relates to new and useful fluorine containing copolymers. More particularly, the invention relates to fluorine containing copolymers which have high high solubility in organic solvents and are capable of being cross-linked with cross-linking agents to impart the copolymer high chemical and thermal stability.

Highly fluorinated polymers, such as polytetrafluoroethylene, polytrifluorochloroethylene, etc., have been well known in the art and are available for uses in which high chemical and thermal stability is required. For instance, such polymers are frequently used to coat the surface of various articles, imparting excellent chemical and thermal stability to the coated articles. At the same time, however, high chemical and thermal stability of the polymers themselves makes their application to surface coatings difficult. Namely in coating the surfaces with such polymers, it is necessary to employ the polymers in the form of aqueous suspension or emulsion due to their own chemical stability, requiring complicated procedure to make continuous films or protective coatings adhering to the treated surfaces.

Accordingly, it is an object of the invention to provide rubber-like or resin-like copolymers of fluorine containing unsaturated monomers, which have high cross-linking ability and solubility in organic solvents.

Further object of the invention is to provide fluorine containing copolymers, which are particularly useful for surface coatings in which the copolymers are employed in the form of solution in organic solvents and the resultant coatings exhibit high chemical and thermal stability by cross-linking the copolymers.

Above and other objects of the invention will be apparent from the following description.

Flourine containing copolymers of the invention comprise monomer units of an unsaturated hydrofluoro compound having the formula:

$$R_f\text{---}CH=CF_2 \quad (I)$$

wherein $R_f$ is fluorine, perfluoroalkyl of 1 to 3 carbon atoms, ω-chloroperfluoroalkyl of 1 to 3 carbon atoms or ω-hydroperfluoroalkyl of 1 to 3 carbon atoms; and of unsaturated fluoro compound having the formula:

$$R'_f\text{---}CF=CF_2 \quad (II)$$

wherein $R'_f$ is perfluoroalkyl of 1 to 3 carbon atoms, ω-chloroperfluoroalkyl of 1 to 3 carbon atoms or ω-hydroperfluoroalkyl of 1 to 3 carbon atoms.

The unsaturated hydrofluoro compound represented by the above Formula I may include, for example, $$CHF=CF_2$$
$$CF_3CH=CF_2,\ CHF_2CF_2CH=CF_2,\ CF_2ClCH=CF_2,$$
$$CF_2HCF_2CF_2CH=CF_2$$
$$CF_2ClCF_2CF_2CH=CF_2,\ CF_3CF_2CH=CF_2,\text{ etc. The unsaturated fluoro compounds of the above Formula II may include, for example, } CF_3CF=CF_2,$$
$$CF_3CF_2CF=CF_2$$
$$CF_2HCF_2CF=CF_2,\ CF_2ClCF_2CF=CF_2,$$
$$CF_3CF_2CF_2CF=CF_2$$
$$CF_2HCF_2CF_2CF=CF_2,\text{ etc.}$$

For convenience, the unsaturated hydrofluoro compound of the Formula I and the unsaturated fluoro compound of the Formula II are referred to hereinafter as "compound (I)" and "compound (II)" respectively.

All of these compounds (I) and (II) used as monomers are known compounds and synthesized by various known methods. The compounds (I) may be produced, for instance, by pyrolysing the fluorocarboxylic acid, $$R_fCHFCF_2COOH$$

($R_f$ being as defined before), under reduced pressure, as described in British Patent 980,569, etc. The compounds (II) may be produced by pyrolysing fluorochlorohydrocarbons, such as difluorochloromethane ($CHF_2Cl$), at between 500° C. and 800° C., or pyrolysing alkali metal salt of the corresponding perfluoro carboxylic acid at 200–400° C.

The proportion of monomer units of the compound (I) in the ultimate copolymer should be between 30 mol percent and 98.5 mol percent, and the proportion of monomer units of the compound (II) should be between 1.5 mol percent and 70 mol percent, in order to secure good solubility and cross-linking ability of the polymer.

The copolymers of the invention are rubber-like or resin-like polymers having intrinsic viscosity of 0.1 to 1.8 measured in methylethyl ketone (100 cc./g.) at 25° C. While the homopolymer of either compound (I) or compound (II) has no elasticity, the copolymers containing 92 mol percent to 30 mol percent of the compound (I) and 8 mol percent to 70 mol percent of the compound (II) is elastomeric like crude rubber. The elasticity of the copolymer increases with the rise of temperature. The copolymers containing less than 30 mol percent or more than 92 mol percent of the compound (I) has no or almost no elasticity.

Homopolymers of compound (I) are soluble in ketones or esters but insoluble in alcohols and homopolymers of compounds (II) are insoluble in almost all organic solvents. The copolymers of the invention can be easily dissolved at room temperature or an elevated temperature in one or more of various organic solvents, e.g. not only ketones or esters but also lower alcohols such as methanol, etc.

In order to secure higher solubility in lower alcohols, the proportion of monomer units is preferably in the range of 45 mol percent to 92 mol percent of the compound (I) and 8 mol percent to 55 mol percent of the compound (II), although all copolymers of the invention are highly soluble in ketones or esters.

The copolymers of the invention, moreover, can be easily cross-linked with cross-linking agents to form the products having high chemical and thermal stability, so that they are useful for coatings in which chemical and thermal stability is required. The cross-linking agents used include organic polyamines such as hexamethylene diamine, hexamethylene tetramine, hexamethylene pentamine carbamates, etc. The cross-linking process is carried out at a temperature varying from room temperature to 150° C., preferably below 50° C. the cross-linking reaction may take few minutes to several days in accordance with the kind of cross-linking agents used, the cross-linking conditions, and other factors.

In order to obtain continuous films or protective coatings of the cross-linked polymers having high chemical and thermal stability the surface to be treated is coated with a coating composition containing the copolymers of the present invention, dipped into a solution of the cross-linking agents and then let to stand at a moderate temperature until cross-linking sets in. It is also possible to employ the coating composition containing the cross-linking agents and the copolymers. In this case the surface coated with said composition is let to stand at a moderate temperature for cross-linking.

As the copolymers of the invention have high solubility in organic solvents, a solution of the copolymers dissolved in various solvents, e.g. ketones, esters, lower aliphatic alcohols, etc., is employed as the coating composition, thus making it possible to form continuous coatings on the surface treated therewith without baking or the like complicated procedure, although an aqueous suspension or emulsion of the copolymers may be used as the coating composition with the subsequent complicated procedure.

Suitable solvents for the polymer include acetone, methylethyl ketone and the like ketones, methyl acetate, ethyl acetate and the like esters, and methanol and the like lower aliphatic alcohols. The cross-linking agents, if desired, may be admixed with said coating composition just before treating the surface. An accelerator may be added in the composition, if necessary. The preferred accelerator includes basic metal oxides, such as zinc oxide, lead oxide, calcium oxide, etc. To the composition may also be added various fillers, such as carbon black and titanium dioxide, and/or diluents such as xylene and benzene, as required.

The copolymers of the invention are produced by polymerizing in the presence of radical initiators in aqueous or nonaqueous system a mixture of the compound (I) and compound (II) supplied in such proportions as to yield the desired copolymer at a temperature of 5–150° C., preferably 20–100° C. under an increased pressure of 5–300 kg./cm.$^2$, preferably 20–150 kg/cm.$^2$. The polymerization may be conducted by the conventional methods, such as emulsion polymerization, suspension polymerization and solution polymerization, the most desirable being emulsion polymerization. Suitable radical initiators used in the invention include benzoyl peroxide, tertiary butyl hydroperoxide, persulphate, hydrogen peroxide and the like peroxides; redox catalysts of said peroxides; and azobisiso butyrate, azobis isobutyro amidine and the like organic azo compounds. The emulsifiers used in the emulsion polymerization include water-soluble salts of fluorine containing carboxylic acid, such as ammonium or alkali metal salts of perfluorocarboxylic acids having 6 to 12 carbon atoms, of ω-hydroperfluorocarboxylic acids having 6 to 12 carbon atoms and of perfluorosulfonic acids having 6 to 12 carbon atoms.

The mixture ratio of the starting monomers, compound (I) and compound (II), should be selected in accordance with the copolymer desired and the polymerization conditions applied. In all cases it should be noticed that the compound (II) may be supplied to the polymerization system in the larger amount than the desired copolymerization ratio in the ultimate copolymer, as reactivity of the compound (II) is lower than that of compound (I). The suitable mole ratio of the compound (II) supplied should be selected from the range of 0.05 to 20 moles, preferably 0.2 to 10 moles per mole of the compound (I) supplied.

For better understanding of the invention examples are given hereinafter, in which all percentages are in weight, unless otherwise specified.

EXAMPLE 1

A stainless steel pressure autoclave charged with 250 ml. of deoxidated water, 2.5 g. of ammonium ω-hydroperfluoro nonanoate and 0.5 g. of ammonium persulfate, and the mixture was frozen and the gas in the autoclave was evacuated after flushed with nitrogen gas, to which were added 42 g. of trifluoroethylene and 75 g. of hexafluoropropylene, then the autoclave was shaked with heating at 80° C. In 20 minutes pressure inside rose to 40 kg./cm.$^2$ and dropped to 26 kg./cm.$^2$ in 4 hours. Then the autoclave was cooled to room temperature, and the unreacted monomer was recovered after which the autoclave was opened and a dispersion in milky color was obtained. The above recovered monomer was mostly hexafluoropropylene. The resultant dispersion was diluted with two times by volume of pure water, to which was added 10 ml. of 10% aqueous solution of magnesium chloride and by stirring the same a polymer was coagulated. The coagulate was filtered with glass filter after repeated washing with water, and the residue was dried whereby 55 g. of a copolymer which was elastic like crude rubber was obtained.

The resultant copolymer was easily soluble in acetone, methylethylketone and methanol at room temperature. The intrinsic viscosity measured in methylethyl ketone at 25° C. was found to be 0.6 (100 cc./g.). And by elementary analysis of the product, the copolymer was found to contain 92 mol percent of trifluoroethylene, and by infrared absorption spectrum analysis a specific absorption due to $CF_3$— not present in homopolymer of trifluoroethylene was observed.

10 g. of the copolymer was dissolved in 200 ml. of methanol at room temperature (25° C.), and the solution was heated at 60° C. with stirring on which 10% methanol solution of caustic soda was added dropwise. During the dropping operation, when the dropping was stopped the alkaline color of phenolphthalene vanished which indicated caustic soda was readily consumed. When 10 ml. of said methanol solution of caustic soda was added dropwise the polymer began precipitating, and when 15 ml. was added dropwise the precipitated polymer was taken out, which was light yellow in color and insoluble in methanol but slightly swelled.

20% acetone solution of the copolymer was prepared, and a steel plate, 20 x 100 x 2 mm., which was polished with sand paper, and degreased with trichloroethylene was coated with the solution to form a film of 0.1 mm. average thickness. This treated steel plate was dipped at 60° C. for 8 hours in a solution consisting of 1000 g. of 50% aqueous solution of methanol in which 50 g. of hexamethylenediamine was dissolved. The surface of the sample turned yellow, and after 24 hours of dipping in methanol and acetone at room temperature no changes were found in the film. It was not affected at all by concentrated sulphuric acid, concentrated hydrochloric acid, concentrated nitric acid and 20% aqueous solution of caustic soda, no corrosion of steel plate observed.

EXAMPLE 2

By the similar manner to Example 1 except that the proportion of monomer supply of trifluoroethylene and hexafluoropropylene was varied as shown in Table 1 below, a copolymer of both above was obtained. The properties of the copolymers were as follows. Pressure at the time of polymerization rose to the maximum in 20 minutes after initiation of polymerization. The value of the maximum pressure was lower for higher ratio of hexafluoropropylene relative to trifluoroethylene.

TABLE 1

| Run No. | Proportion of monomers (mol ratio) | | Composition of copolymer (mol ratio) | | Elasticity | Solubility (25° C.) | | Cross-linking property |
|---|---|---|---|---|---|---|---|---|
| | 3F | 6F | 3F | 6F | | Acetone | Methanol | |
| I | 100 | 0 | 100 | 0 | c | a | c | b |
| II | 95 | 5 | 98.4 | 1.6 | c | a | b | b |
| III | 80 | 20 | 92 | 8 | b | a | a | a |
| IV | 30 | 70 | 64 | 36 | a | a | a | a |
| V | 20 | 80 | 41 | 59 | a | a | b | a |
| VI | 10 | 90 | 28 | 72 | b | b | c | b |
| VII | 0 | 100 | 0 | 100 | c | c | c | c |

NOTE.—3F=trifluoroethylene 6F=hexafluoropropylene Run No. III corresponds to Example 1.

Method of test and determination

*Elasticity.*—A glass plate was coated with a 5% methylethyl ketone solution of the polymer obtained by Run No. I to VI or with a 3% perfluoro dimethyl cyclobutane solution of the polymer obtained by Run No. VII and dried to form a film of 0.1 mm. average thickness.

The resultant film was stripped off and elongated for 100%, and the extent of recovery was measured on releasing the elongated film:

a: immediately recovered
b: retarded in recovery
c: not recovered

*Solubility.*—20 g. of the resultant copolymer was dissolved in 100 ml. of the specified solvent at 25° C. with stirring for 24 hours, and solubility was determined by the following standard:

a: easily dissolved
b: dissolved with some insoluble residue
c: not dissolved or swollen

*Crosslinking property.*—A glass plate was coated with the same polymer solution as prepared in the above elasticity test and dried to form a film of 0.1 mm. average thickness, and then dipped at 60° C. for 8 hours for crosslinking in a solution of 50 g. of hexamethylene diamine dissolved in 1000 g. of 50% aqueous solution of methanol.

The cross-linked film was stripped off and determined by whether the film was dissolved in acetone and methanol.

a: Insoluble
b: Swelled
c: Dissolved (non crosslinking)

EXAMPLE 3

The same autoclave as Example 1 was similarly charged with 49 g. of 1,1,3,3,3-pentafluoropropylene and 75 g. of hexafluoro propylene and the mixture was reacted at 80° C. After 20 minutes of the reaction pressure rose to 24 kg./cm.² and in further 18 hours it dropped to 20 kg./cm.². Same procedure as Example 1 was carried out and a dispersion milky white in color was obtained, which was coagulated with 10% aqueous solution of magnesium chloride and washed with water and dried whereby 22 g. of a polymer like crude rubber was obtained, and from the methylethylketone solution of this polymer was measured at 25° C. its intrinsic viscosity being 0.45 (100 cc./g.).

10 g. of the above copolymer was dissolved in 100 ml. of acetone. Steel plate, 20 x 100 x 2 mm. which was cleaned as in Example 1 was dipped in the resultant solution and then dried in the air, dried at 60° C. in air oven so as to form a film 0.05 mm. average thickness. The resultant sample was dipped in ethylene diamine at room temperature for 10 minutes. The film was colored brown. After thoroughly washing the sample was heat-treated at 150° C. in air oven for 16 hours. The resultant film was perfectly insoluble in methanol and acetone, and was not affected at all by dipping in concentrated sulphuric acid, concentrated hydrochloric acid, concentrated nitric acid and 20% aqueous solution of caustic soda at room temperature for 8 hours.

EXAMPLE 4

By the similar manner to Example 3 except that the proportion of 1,1,3,3,3-pentafluoropropylene and hexafluoropropylene was varied as shown in Table 2 copolymers as shown in the Table 2 were obtained. Pressure on the reaction system reached the maximum in 20 minutes of reaction, whose value was higher for a higher ratio of hexafluoropropylene relative to pentafluoropropylene.

TABLE 2

| Run No. | Proportion of monomers (mol ratio) | | Composition of copolymer (mol ratio) | | Elasticity | Solubility (25° C.) | | Cross-linking property |
|---|---|---|---|---|---|---|---|---|
| | 5F | 6F | 5F | 6F | | Acetone | Methanol | |
| VIII | 100 | 0 | 100 | 0 | c | a | c | b |
| IX | 95 | 5 | 97 | 3 | c | a | b | a |
| X | 80 | 20 | 82 | 18 | b | a | a | a |
| XI | 30 | 70 | 45 | 55 | a | a | a | a |
| XII | 0 | 100 | 0 | 100 | c | c | c | c |

NOTE.—5F=pentafluoropropylene; 6F=hexafluoropropylene; Run No. IX corresponds to Example 3.

Methods of test and determination same as Example 2.

EXAMPLE 5

By the similar manner to Example 1, 91 g. of 4-hydroperfluorobutene-1 and 41 g. of trifluoroethylene were polymerized in 4 hours whereby 65 g. of a polymer was obtained whose intrinsic viscosity was 0.6. The resultant polymer was easily soluble in methanol and acetone, and the film of the cross-linked polymer obtained by the same manner as Example 3 exhibited excellent corrosion-resistant property.

What we claim is:

1. A cross-linkable copolymer comprising between 92 and 64 mole percent of trifluoroethylene, and between 8 and 36 mole percent hexafluoropropylene.

2. A cross-linkable copolymer comprising between 82 and 45 mole percent of pentafluoropropylene, and between 18 and 55 mole percent of hexafluoropropylene.

References Cited

UNITED STATES PATENTS 3,163,628   12/1964   Bolstad _____ 260—87.5

JOSEPH L. SCHOFER, Primary Examiner

J. A. DONAHUE, JR., Assistant Examiner